United States Patent
San Martin et al.

(10) Patent No.: US 9,625,605 B2
(45) Date of Patent: Apr. 18, 2017

(54) SYSTEMS AND METHODS FOR PERFORMING RANGING MEASUREMENTS USING THIRD WELL REFERENCING

(71) Applicant: Halliburton Energy Services, Inc., Houston, TX (US)

(72) Inventors: Luis San Martin, Houston, TX (US); Burkay Donderici, Houston, TX (US); Hsu-Hsiang Wu, Sugar Land, TX (US); Svetozar Dimitrov Simeonov, Houston, TX (US); Malcolm Upshall, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 33 days.

(21) Appl. No.: 14/650,238

(22) PCT Filed: Dec. 21, 2012

(86) PCT No.: PCT/US2012/071226
§ 371 (c)(1),
(2) Date: Jun. 5, 2015

(87) PCT Pub. No.: WO2014/098891
PCT Pub. Date: Jun. 26, 2014

(65) Prior Publication Data
US 2015/0331139 A1 Nov. 19, 2015

(51) Int. Cl.
*G01V 3/28* (2006.01)
*E21B 47/022* (2012.01)
*G01V 3/26* (2006.01)

(52) U.S. Cl.
CPC .............. *G01V 3/28* (2013.01); *E21B 47/022* (2013.01); *E21B 47/02216* (2013.01); *G01V 3/26* (2013.01)

(58) Field of Classification Search
CPC combination set(s) only.
See application file for complete search history.

(56) References Cited

U.S. PATENT DOCUMENTS

| 4,593,770 A | 6/1986 | Hoehn |
| 7,475,741 B2 | 1/2009 | Waters |

(Continued)

FOREIGN PATENT DOCUMENTS

| WO | 2009/142782 A2 | 11/2009 |
| WO | 2010/065208 A1 | 6/2010 |
| WO | 2010/147699 A1 | 12/2010 |

OTHER PUBLICATIONS

International Search Report and Written Opinion issued in related PCT Application No. PCT/US2012/071226 mailed on Jun. 19, 2013, 13 pages.

(Continued)

*Primary Examiner* — Clayton E Laballe
*Assistant Examiner* — Jas Sanghera
(74) *Attorney, Agent, or Firm* — Alan Bryson; Baker Botts L.L.P.

(57) ABSTRACT

Systems and methods for obtaining ranging measurements are described herein. An example method includes injecting a current 115 into a formation from a first borehole 106 to induce an electromagnetic field 120 within the formation. The current 115 may be received at a second borehole 107. The induced electromagnetic field 120 may be measured. The measurements may be taken, for example, from the first borehole 106, the second borehole 107, or another borehole 102 within the formation. The method may also include identifying the location of a third borehole 102 within the formation based, at least in part, on the measured electromagnetic field 120.

20 Claims, 3 Drawing Sheets

(56) References Cited

U.S. PATENT DOCUMENTS

| | | |
|---|---|---|
| 7,703,548 B2 | 4/2010 | Clark |
| 2006/0113112 A1 | 6/2006 | Waters |
| 2009/0260878 A1 | 10/2009 | Morley et al. |
| 2009/0260879 A1 | 10/2009 | Clark et al. |
| 2010/0155139 A1* | 6/2010 | Kuckes ............ E21B 47/02216 175/45 |
| 2011/0109470 A1 | 5/2011 | Clark et al. |
| 2011/0308789 A1 | 12/2011 | Zhang et al. |
| 2012/0158305 A1* | 6/2012 | Rodney .................. G01V 3/26 702/6 |

OTHER PUBLICATIONS

International Preliminary Report on Patentability issued in related PCT Application No. PCT/US2012/071226 mailed on Apr. 17, 2015, 13 pages.

Office Action issued in related Australian patent application No. 2012397234, mailed on Dec. 5, 2015 (2 pages).

* cited by examiner

SYSTEMS AND METHODS FOR PERFORMING RANGING MEASUREMENTS USING THIRD WELL REFERENCING

CROSS-REFERENCE TO RELATED APPLICATION

The present application is a U.S. National Stage Application of International Application No. PCT/US2012/071226 filed Dec. 21, 2012, which is incorporated herein by reference in its entirety for all purposes.

BACKGROUND

The present disclosure relates generally to well drilling operations and, more particularly, to Systems and Methods for Performing Ranging Measurements using Third Well Referencing.

In certain instances, such as in a blowout, it may be necessary to intersect a first well, called a target well, with a second well, called a relief well. The second well may be drilled for the purpose of intersecting the target well, for example, to relieve pressure from the blowout well. Contacting the target well with the relief well typically requires multiple downhole measurements to identify the precise location of the target well. Typically, these measurements require interaction between the target well and the relief well, as well as measurements taken as part of a measurement-while-drilling assembly (MWD) within the relief well. Unfortunately, accessing the target well can be difficult in some instances, such as where the casing is partially destroyed in a blowout, making interaction between the target and relief wells difficult. Additionally, measurement techniques that use only the relief well can result in inaccurate or imprecise measurements. For example, if formation excitation and subsequent measurements are performed solely at the relief well, the formation excitation may interfere with the measurements.

FIGURES

Some specific exemplary embodiments of the disclosure may be understood by referring, in part, to the following description and the accompanying drawings.

Figure 1:
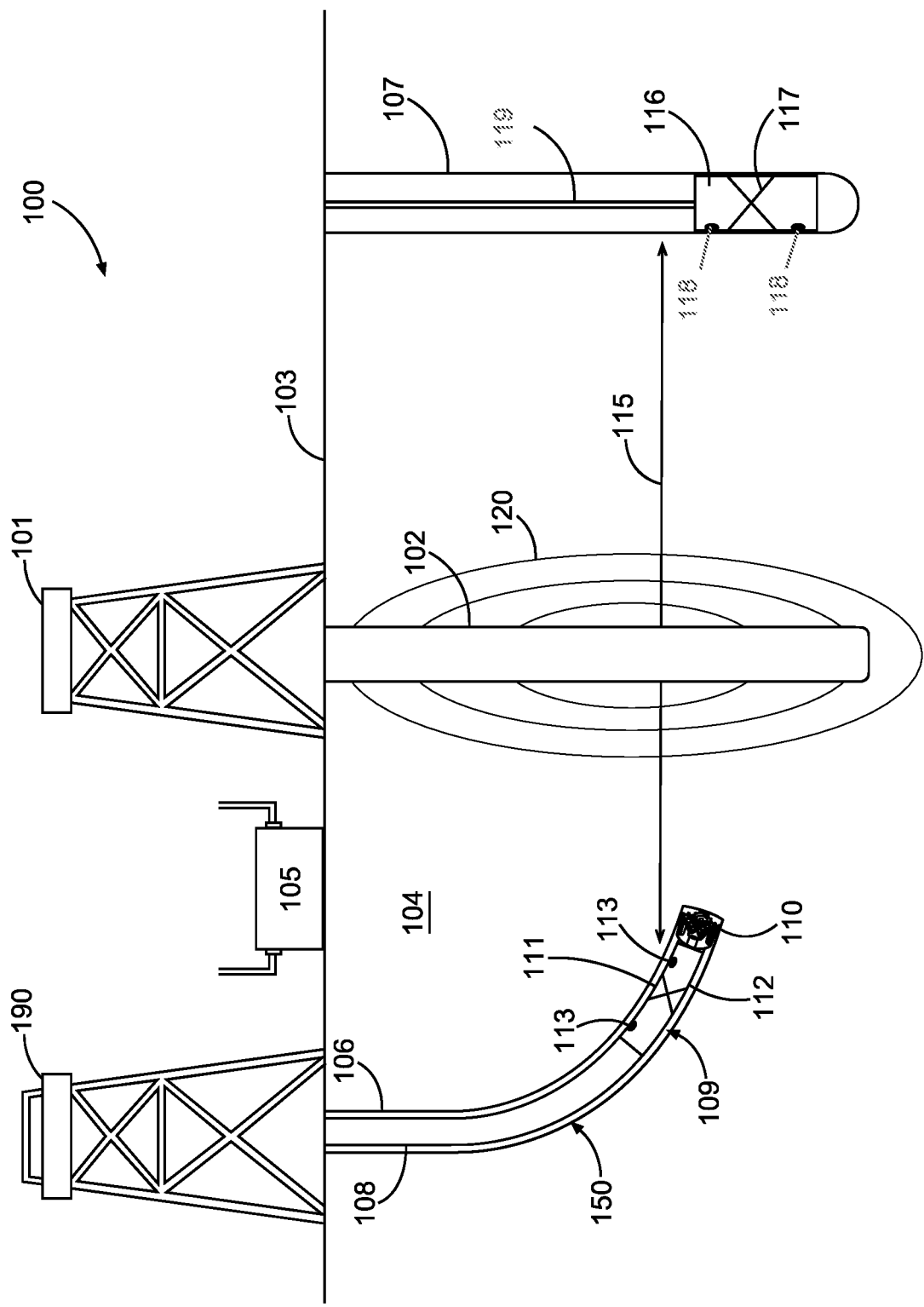
FIG. 1 is a diagram illustrating an example drilling system, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to Systems and Methods for Performing Ranging Measurements using Third Well Referencing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise non-rectilinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

According to aspects of the present disclosure, systems and methods for obtaining ranging measurements are described herein. One example method discussed below includes injecting an electrical current (alternatively referred to simply as "current") into a formation from a first borehole, with the current inducing an electromagnetic ("EM") field within the formation. Typically, the current comprises an alternating current ("AC"). As will be described below, the current may be injected via an electrode positioned in the first borehole, or by energizing a casing disposed within the first borehole. The current may be received at a second borehole, such as at an electrode disposed within the second borehole. The induced electromagnetic field may be measured. The EM field may be measured, for example, from the first borehole, the second borehole, or another borehole within the formation. The method may also include identifying the location of a third borehole within the formation based, at least in part, on the measurement of the EM field. In certain embodiments, one or both of the first borehole and the second borehole may comprise relief wells, and the third borehole may comprise a target well. Additionally, a drilling parameter of a drilling assembly positioned within the formation may be altered based on the location of the third borehole. In certain embodiments, the drilling assembly may be disposed in a relief well, and the drilling parameter may be a trajectory of the relief well calculated to intersect the target well. Advantageously, as will be described in detail below, by incorporating a third well into the ranging measurements, current injection, current reception, and measurement can be moved totally from the target well and partially from the relief well, increasing the depth of measurement and the integrity of the measurements.

FIG. 1 shows an example drilling system 100, incorporating an additional borehole for ranging measurements in addition to one relief well and one target well, according to aspects of the present disclosure. The drilling system 100 includes rigs 101 and 190 mounted at the surface 103 and positioned above boreholes 102 and 106, respectively, within a subterranean formation 104. An additional borehole 107 may also be within the subterranean formation 104. In the embodiment shown, the borehole 106 may be in the process of being drilled and may comprise a relief well that is intended to intersect a target well, as will be described below. Rig 190 may be coupled to a drilling assembly 150, comprising drill string 108 and bottom hole assembly (BHA) 109. The BHA 109 may comprise a drill bit 110 and a MWD apparatus 112. In certain embodiments, at least one electrode 113 and at least one antenna 111 may be coupled to the BHA 109. As will be described below, the at least one electrode 113 may inject or receive current 115 into the formation, and the at least one antenna 111 may measure an EM field 120 within the formation 104 that is induced by the current 115. The induced EM field 120 may indicate the location of the borehole 102. As will be appreciated by one of ordinary skill in the art in view of this disclosure, the position of the at least one electrode 113 and the at least one antenna 111 may be moved to various locations along the drilling assembly. Additionally, in certain embodiments, one or both of the electrodes 113 and antenna 111 may be omitted from the drilling assembly 150.

The borehole 102 may comprise a target well that has been either totally or partially drilled on a previous occasion by rig 101 and a drilling assembly similar to drilling assembly 109. The borehole 102 may be uncased, partially cased, or totally cased. In certain instances, the borehole 102 may be a completed well that was at one time producing but has since suffered catastrophic failure, such as a blowout. In certain embodiments borehole 102 may need to be intersected by drilling assembly 109 and borehole 106 so that pressure within the borehole 102 may be reduced. As described above, identifying the precise location of the target well 102 may be difficult. But the precise location of the target well may need to be known so that a drilling parameter of the drilling assembly 109, such as a drilling trajectory of the drilling assembly 109, can be selected or altered to intersect the target well 102.

According to aspects of the present disclosure, an additional borehole 107, other than relief well 106 and target well 102, may be used as part of the ranging measurements to increase the accuracy of formation measurements. In certain embodiments, borehole 107 may comprise a borehole that was previously drilled for survey purposes, or may be a producing well within the formation 104. Likewise, as will be described below with respect to FIG. 2, the additional borehole may also be a second relief well being drilled to intersect the target well. In the embodiment shown, a downhole wireline tool 116 is disposed in the borehole 107 via a wireline 119. As can be seen, the downhole tool 116 comprises at least one electrode 118 and at least one antenna 117. The at least one electrode 118 may inject alternating current (AC) 115 into or receive AC 115 from formation 104, and the at least one antenna 117 may measure an EM field 120 that is induced in formation 104 by the current 115. The induced EM field 120 may indicate the location of the borehole 102. In certain embodiments, AC may also be injected into or received from formation 104 at an electrode (not shown) disposed within the target well 102. This may increase the visibility of the target well 102. As will be appreciated by one or ordinary skill in the art in view of this disclosure, the configuration of the downhole tool 116 may be altered including the placement of the at least one electrode 118 and the at least one antenna 117, or the omission of either.

The downhole tool 116 and the drilling assembly 150 may be in communication with a control unit 105 at the surface. The downhole tool 116, for example, may communicate with the surface via wireline 119, and data received at the surface may be communicated to the control unit 105 directly or through a wireless transmission system. The drilling assembly 150, and in particular BHA 109, may communicate with the surface via a telemetry system. In certain embodiments, the control unit 105 may comprise an information handling system with a processor and a memory device coupled to the processor. The memory device may contain instructions that cause the processor to send control signals to the BHA 109 and downhole tool 116. For example, the control unit 105 may cause one of the at least one electrodes on the BHA 109 or the downhole tool 116 to inject current into the formation, cause at least one of the electrodes on the other one of the BHA 109 and downhole tool 116 to receive the current, and cause one of the at least one antenna on the BHA 109 or downhole tool 116 to measure the EM field 120. The measurements may then be received at the control unit 105, which may process the measurements and alter a drilling parameter of the drilling assembly 150 based on the processed measurements.

Figure 2:
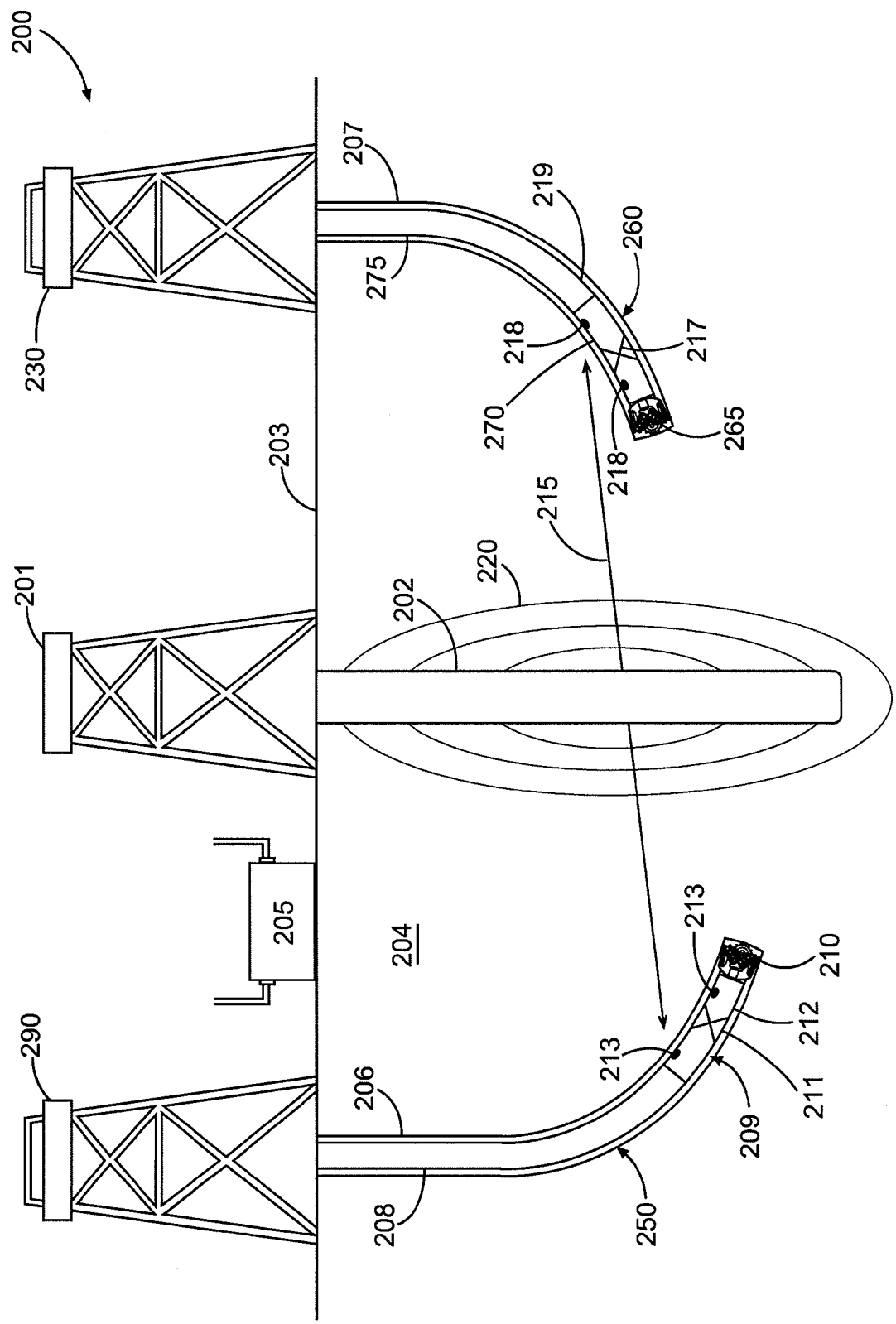
FIG. 2 is a diagram illustrating an example drilling system, according to aspects of the present disclosure.

FIG. 2 shows another example drilling system 200, incorporating an additional borehole for ranging measurements beyond one relief well and one target well, according to aspects of the present disclosure. The drilling system 200 includes rigs 201, 290, and 230 mounted at the surface 203 and positioned above boreholes 202, 206, and 207, respectively, within a subterranean formation 204. Unlike FIG. 1, in which the additional borehole 107 is an existing borehole, borehole 207 may be in the process of being drilled, like borehole 206, and both may comprise relief wells that are intended to intersect target well/borehole 202. Rigs 290 and 230 may be coupled to a drilling assemblies 250 and 219, respectively, with the drilling assemblies 250 and 219 respectively comprising drill strings 208 and 275, and BHAs 209 and 260. The BHAs 209 and 260 may respectively comprise drill bits 210 and 265, and MWD apparatuses 212 and 270. In certain embodiments, at least one electrode 213 and 218 and at least one antenna 211 and 217 may be coupled to the BHAs 209 and 260, respectively. As will be described below, at least one electrode of one BHA 209 and 260 may inject current 215 into the formation, and the other may receive current 215. Likewise, one or both of antennas 211 and 217 may measure an EM field 220 within the formation 204. As will be described below, the EM field 220 may be excited within the formation 204 and around borehole 202. By measuring the EM field 220, the drilling systems 100 and 200 may identify a location of the target well/borehole 202.

The positions of the electrodes 213 and 218 in FIG. 2, as well as the positions of antenna 211 and 217, are not meant to be limiting. For example, in certain embodiments, one or both of the electrodes and antenna may be omitted from the drilling assemblies. Additionally, the number and positions of boreholes in the formations 104 and 204 are not intended to be limiting. In certain embodiments, additional boreholes may be used to effectuate the ranging measurement process. For example, instead of injecting current into the formation or receiving current from the formation at a drilling assembly in a relief well, a fourth borehole with a downhole tool similar to downhole tool 116 may be used to inject current into the formation. In such embodiments, it may be possible that the drilling assembly need not inject current or receive current, meaning that the drilling assembly need only measure the EM field from the formation. This may increase the accuracy of the measurements, as the measurements would not receive interference from the injected or received current at the drilling assembly.

According to certain embodiments, a method for obtaining ranging measurements is also described herein. The method may be utilized in systems 100 and 200 and those similar to them. In certain embodiments, the method may include injecting a current into a formation from a first borehole. The current may be injected from electrodes disposed in the borehole, or, in certain embodiments, by energizing a casing disposed in the borehole. The method may further comprise receiving the current from the formation at a second borehole. The current may be received, for example, through electrodes disposed in the borehole, or another current return structure that would be well known in the art in view of this disclosure. Additionally, the method may include measuring the induced EM field, using, for example, at least one antenna disposed in one of the first borehole and the second borehole.

With respect to FIG. 1, in one embodiment, the current 115 may be injected into formation 104 from the at least one electrode 113 in the drilling assembly 150, and may be received at the at least one electrode 118 in the downhole tool 116. In another embodiment, the current 115 may be injected into formation 104 from the at least one electrode 118 in the downhole tool 116, and may be received in at least one electrode 113 in the drilling assembly 150. In either embodiment, the induced EM field 120 may be measured by the at least one antenna 111 disposed in the borehole 106 or the at least one antenna 117 disposed in the borehole 107.

With respect to FIG. 2, in one embodiment, the current 215 may be injected into formation 204 from at least one electrode 213 in the drilling assembly 250, and may be received at the at least one electrode 218 in the drilling assembly 219. In another embodiment, the current 215 may be injected into formation 204 from the at least one electrode 218 in the drilling assembly 219, and may be received at least one electrode 213 in the drilling assembly 250. In either embodiment, the induced EM field 220 may be measured by the at least one antenna 213 disposed in the borehole 206 or the at least one antenna 217 disposed in the borehole 207. Additionally, as mentioned above, the current injection and reception may be accomplished in boreholes separate from a relief well and a target well. In such instances, the measurement may take place at an antenna disposed on a drilling assembly in a relief well, with the injection and reception of the current taking place at two boreholes separate from the target and relief wells.

In certain embodiments, the method may further include identifying the location of a third borehole within the formation based, at least in part, on the measured EM field. The third borehole may comprise a target well. As described above, the current injected into a formation may induce an EM field within the formation. The induced EM field may identify variations in the formation, including the location of the target well. After the EM field is measured, it may be transmitted to a control unit, where the location of the target well may be determined. For example, the measured EM field may be compared to or incorporated into a formation model that was generated using previously acquired formation survey data. The location of the third borehole may be identified, for example, using the comparison of the updated formation model.

Figure 3:
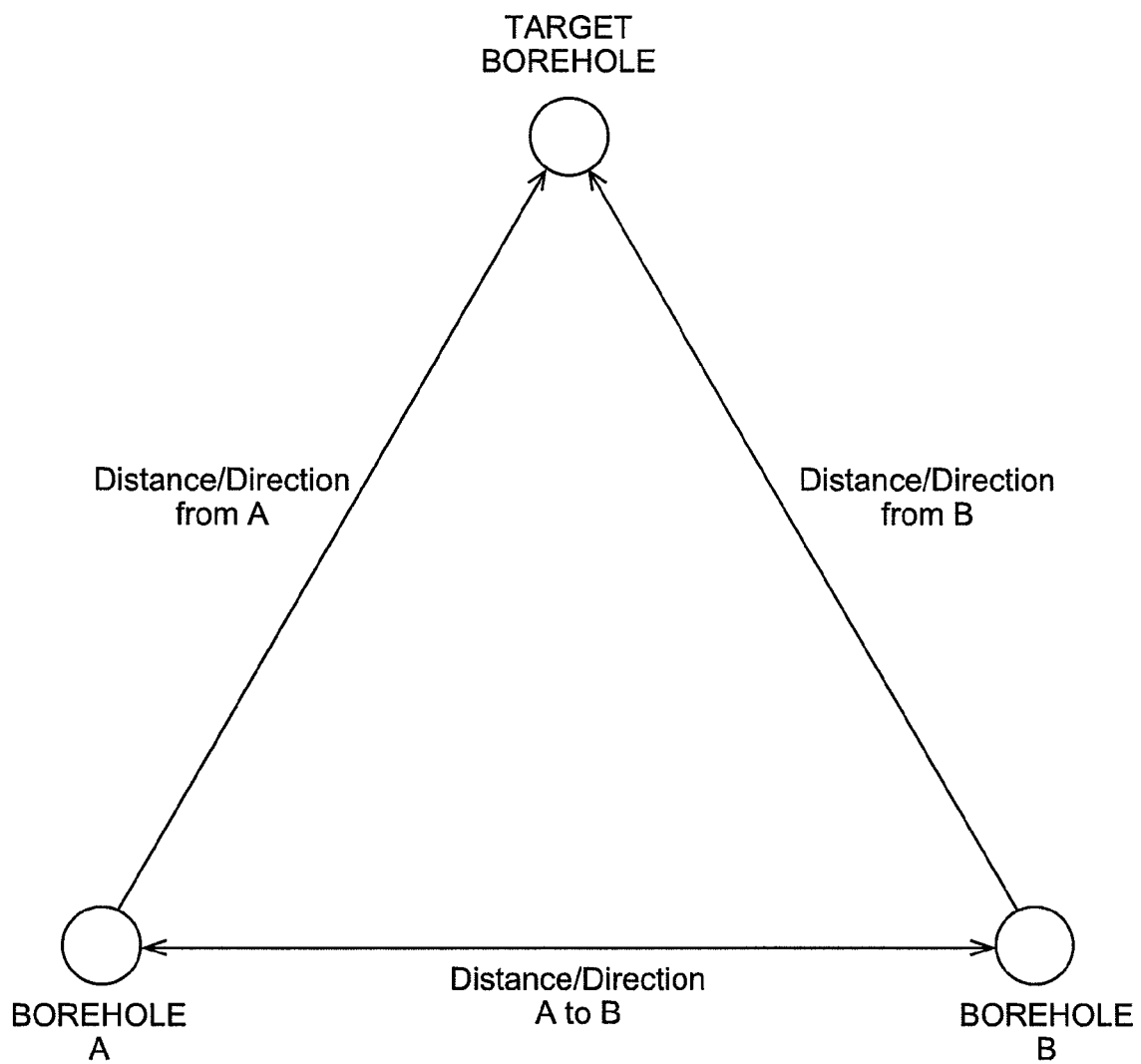
FIG. 3 is a diagram illustrating an example ranging process, according to aspects of the present disclosure.

In certain embodiments, identifying the location of a third borehole within the formation based, at least in part, on the measured EM field may include identifying the location of the third borehole with respect to at least one of the first borehole and the second borehole. As can be seen in FIG. 3, a direction and distance may be identified between a first borehole A, a second borehole B, and a target borehole. In certain embodiments, the location of the target borehole may be identified by ranging the target borehole from the first borehole A or the second borehole B. Additionally, in certain embodiments, the location of the target borehole may be identified by triangulating the position of the target borehole using its direction and distance to both the first borehole A and the second borehole B. In certain other embodiments, the location of the target borehole may be identified by determining the distance between a first borehole A and a second borehole B, determining the direction from each of the boreholes to the target well, and using trigonometric relations to identify the position of the target well. The first borehole A and second borehole B may include relief wells, survey wells, or other wells as described above. Additionally, the first borehole A or second borehole B may be existing production wells, or another formation feature, with a location that is well known. In such instances, the location of the target borehole may be identified with respect to the known location.

Once the location of the third borehole has been identified, the method may also include altering a drilling parameter of a drilling assembly positioned within the formation based on the location of the third borehole. As described above, the third borehole may comprise a target well that needs to be intersected by a relief well. The relief well may be in the process of being drilled and may include a drilling assembly disposed therein. Example relief wells are boreholes 106, 206, and 207 described above. In certain embodiments, the current position and trajectory of the drilling assembly or BHA may be identified using the measured EM field, the formation model described above, or other measurement equipment incorporated into the drilling assembly/BHA. In certain embodiments, the current position and trajectory of the BHA may be communicated to a control unit, along with the measurement of the induced EM field. The control unit may adjust a drilling parameter, such as the trajectory of the drilling assembly, according to the above data so that the relief well is pointed towards the target well. In the case where multiple relief wells are being drilled, such as in FIG. 2, the drilling parameters of all of the relief wells may be altered based on the location of the third borehole.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for obtaining ranging measurements, comprising:
 injecting a current into a formation from a first borehole to induce an electromagnetic field in the formation;

receiving the current from the formation at a second borehole;

measuring the electromagnetic field with at least one antenna located in at least one of the first borehole and the second borehole;

identifying the location of a third borehole within the formation based, at least in part, on the measured electromagnetic field; and based on the identified location of the third borehole, altering a drilling parameter of a drilling assembly positioned within the formation outside of the third borehole, wherein the drilling parameter is altered.

2. The method of claim 1, wherein:
the drilling assembly is disposed in the first borehole;
the first borehole comprises a relief well; and
the third borehole comprises a target well.

3. The method of claim 2, further comprising:
introducing at least one antenna and at least one electrode into the second borehole;
receiving the current at the at least one electrode; and
measuring the electromagnetic field with the at least one antenna.

4. The method of claim 1, wherein:
the drilling assembly is disposed in the second borehole;
the second borehole comprises a relief well; and
the third borehole comprises a target well.

5. The method of claim 4, further comprising:
introducing at least one antenna and at least one electrode into the first borehole;
injecting the current with the at least one electrode; and
measuring the electromagnetic field with the at least one antenna.

6. The method of claim 1, wherein the drilling assembly comprises the at least one electrode and at least one antenna, and wherein the electromagnetic field is measured using the at least one antenna.

7. The method of claim 1, wherein:
the drilling assembly is disposed in the first borehole;
a second drilling assembly is disposed in the second borehole;
the first and second boreholes comprise first and second relief wells, respectively; and
the third borehole comprises a target well.

8. The method of claim 7, further comprising:
altering a drilling parameter of the second drilling assembly based on the location of the third borehole.

9. The method of claim 1, further comprising one of:
injecting a second current into a formation from the third borehole; and
receiving the current from the formation at the third borehole;
wherein the third borehole comprises a target well.

10. The method of claim 1, wherein the step of identifying the location of a third borehole within the formation based, at least in part, on the measured electromagnetic field comprises:
identifying the location of the third borehole with respect to at least one of the first borehole and the second borehole.

11. The method of claim 1, wherein the drilling parameter comprises a trajectory of the drilling assembly.

12. A system for obtaining ranging measurements, comprising:
a first electrode disposed within a first borehole in a formation;
a second electrode disposed within a second borehole in the formation;
at least one antenna disposed within at least one of the first borehole and the second borehole;
a control unit in communication with the first electrode, the second electrode, and the at least one antenna, wherein the control unit:
causes the first electrode to inject a current into the formation;
causes the second electrode to receive the current from the formation;
causes the at least one antenna to measure an electromagnetic field induced by the current;
identifies the location of a third borehole within the formation based, at least in part, on the measured electromagnetic field; and
alters a drilling parameter of a drilling assembly positioned within the formation outside of the third borehole, wherein the drilling parameter is altered based on the location of the third borehole.

13. The system of claim 12, wherein:
the drilling assembly is disposed in the first borehole;
the first borehole comprises a relief well; and
the third borehole comprises a target well.

14. The system of claim 13, further comprising a downhole tool disposed in the second borehole, wherein the second electrode and the at least one antenna are coupled to the downhole tool.

15. The system of claim 12, wherein:
the drilling assembly is disposed in the second borehole;
the second borehole comprises a relief well; and
the third borehole comprises a target well.

16. The system of claim 15, further comprising a downhole tool disposed in the first borehole, wherein the first electrode and the at least one antenna are coupled to the downhole tool.

17. The system of claim 12, further comprising a third electrode disposed in the third borehole, wherein the control unit causes the third electrode to inject a second current into the formation or receive the current from the formation.

18. The method of claim 1, wherein:
the drilling assembly is disposed in the first borehole;
a second drilling assembly is disposed in the second borehole;
the first and second boreholes comprise first and second relief wells, respectively; and
the third borehole comprises a target well.

19. A method for obtaining ranging measurements, comprising:
injecting a current into a formation from a first borehole to induce an electromagnetic field in the formation;
receiving the current from the formation at a second borehole;
measuring the electromagnetic field at a drilling assembly disposed within the formation;
identifying the location of a third borehole within the formation based, at least in part, on the measured electromagnetic field; and
altering a drilling trajectory of the drilling assembly disposed to intersect with the third borehole.

20. The method of claim 19, wherein:
the drilling assembly is disposed in a fourth borehole;
the current is injected from a first electrode coupled to a first downhole tool that is disposed in the first borehole; and
the current is received at a second electrode coupled to a second downhole tool that is disposed in the second borehole.

* * * * *